Feb. 18, 1941.   L. L. BELTZ   2,231,876
MOTOR VEHICLE TRANSMISSION CONTROL
Filed Jan. 19, 1939

INVENTOR.
Lester L. Beltz
BY Tibbetts & Hart
ATTORNEYS

Patented Feb. 18, 1941

2,231,876

UNITED STATES PATENT OFFICE 2,231,876

MOTOR VEHICLE TRANSMISSION CONTROL

Lester L. Beltz, Detroit, Mich., assignor to Packard Motor Car Company, Detroit, Mich., a corporation of Michigan Application January 19, 1939, Serial No. 251,863

8 Claims. (Cl. 74—472)

This invention relates to motor vehicles and more particularly to transmission control mechanism for motor vehicles. Some motor vehicle drive mechanisms are now equipped with an overdrive or an underdrive gearing made effective or ineffective by a control separate from the usual change speed shift lever. One form of such separate control employed with overdrive gearing includes an electric system in which a switch, under control of the vehicle engine accelerator pedal, energizes a solenoid for shifting a clutch in opposition to spring pressure. In order that the solenoid can shift the clutch to ineffective position, in order to make the overdrive ineffective, it is necessary to relieve the driving torque so that the clutch teeth can be disengaged, and it is customary to relieve the driving torque on the clutch by temporarily interrupting the engine ignition by means of a shorting arrangement operated in conjunction with the solenoid system that controls the overdrive clutch.

Difficulty has been encountered with such systems because of failure of the solenoid coils or of the controlling switch with the result that the spark ignition interruption continues instead of being temporary as desired. This continued interruption of the ignition beyond the desired period is especially undesirable because a shift is required in order to accelerate vehicle speed in passing another vehicle on the road and the driver finds himself with a dead motor at a critical time. This difficulty is known and it is customary to utilize a fuse in the electric system that will burn out after a limited shorting of the ignition system to cause resumption of the ignition. Such a fuse arrangement in this type of system eliminates the danger of a dead motor but it necessitates continued travel in overdrive unless it is replaced after being burned out, and such replacement requires undesirable service and a supply of fuses.

An object of the invention is to provide a motor vehicle control mechanism in which the ignition is reliably interrupted and resumed in proper sequence for a shifting operation in a change speed drive mechanism.

Another object of the invention is to provide a motor vehicle control mechanism that will short the engine ignition system and shift a clutch to change the driving speed upon depression of the accelerator pedal and will reliably assure resumption of the ignition system upon relieving pressure on the accelerator pedal.

Other objects of the invention will appear from the following description taken in connection with the drawing, which forms a part of this specification, and in which.

Figure 1:
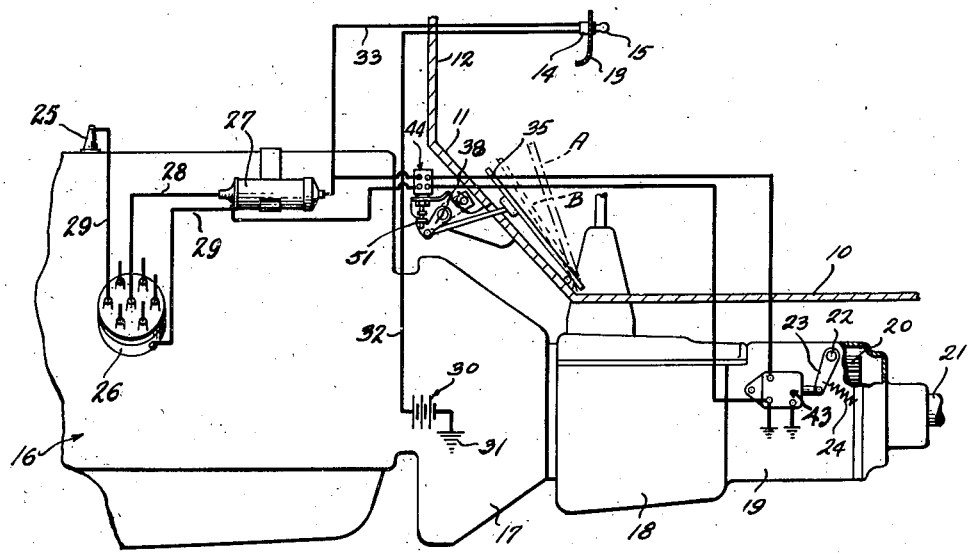
Fig. 1 is a fragmentary side elevation of the power transmitting mechanism of a motor vehicle having the invention associated therewith.
Figure 2:
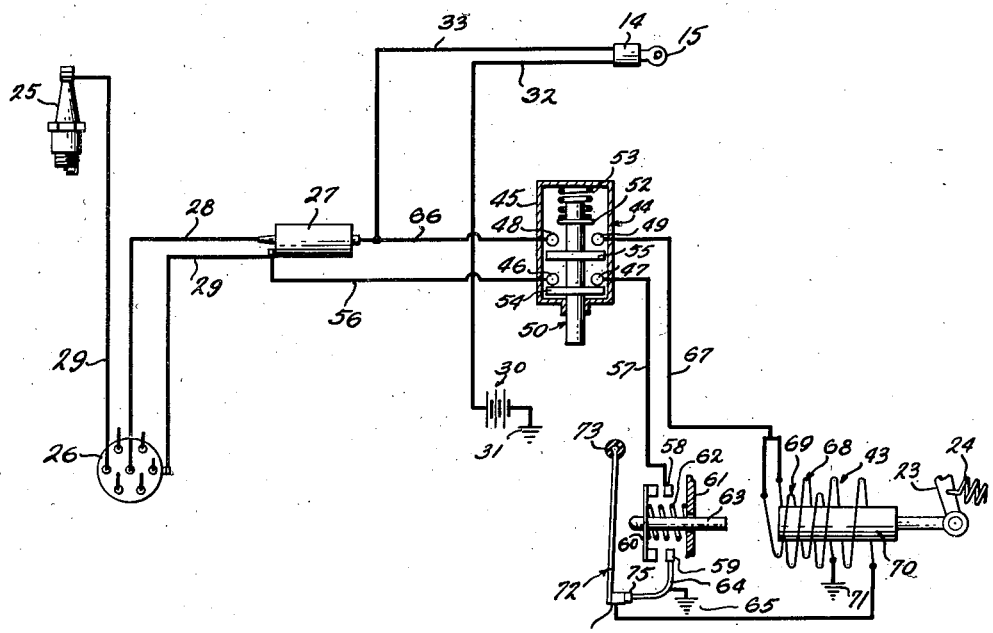
Fig. 2 is a diagrammatic view of the electric system utilized to control the shorting of the engine and the shifting of the overdrive clutch in the power transmitting mechanism.

Referring to the drawing by characters of reference, 10 represents the floor board of a motor vehicle body having a toe board 11 at its forward end and a dash 12 extending upwardly from the forward end of the toe board. The instrument board is indicated at 13 and carries the conventional ignition switch 14 that is controlled by a key 15.

The power transmitting unit consists of the engine 16, the main clutch containing casing 17 located at the rear end of the engine, the casing 18 containing conventional change speed mechanism, and casing 19 containing an overdrive mechanism. The several parts of the unit are conventional and the overdrive casing is broken away to illustrate a shiftable speed changing element in the form of a clutch 20 that is moved axially to engage or disengage the overdrive with the driven shaft 21. The clutch is controlled by a conventional shifting fork (not shown) fixed on a shaft 22 in the overdrive casing, such shaft having a lever 23 fixed to an end that projects exteriorly of the overdrive casing. A coil spring 24 engages the lever 23 and a suitable part on the vehicle in a manner to normally move the clutch rearwardly into overdrive relation.

Associated with the engine is a conventional ignition system that includes spark plugs 25, a distributor 26 and a coil 27. The distributor is connected with the spark plugs by the usual wiring 29 and between the distributor and the ignition coil is a high tension line 28 and a low tension line 29. The ignition coil is connected with the ignition switch 14 by a wire 33 and a wire 32 leads from the ignition switch to the battery 30 that is suitably grounded, as indicated at 31, to the vehicle. It will be understood that this ignition system is controlled at the switch 14 by the ignition key 15 in the usual manner.

As one means for shifting the lever 23 controlling the clutch 20 to disconnect the same so that the transmission mechanism will drive at a lower speed ratio than overdrive, it is conventional to provide a solenoid system in parallel with the engine ignition system. In such a system the solenoid indicated generally at 43 comprises a pair of coils 68 and 69 and a plunger 70. The coils are connected by means of wires 66 and 67 with the ignition line 33, and between such lines is a control switch indicated generally at 44. The coil 69 has considerably less capacity than the coil 68 and is grounded to some suitable portion of the vehicle as indicated at 71. The coil 68 extends to the terminal 74 on a breaker 72 suitably mounted in insulation at 73. The breaker is preferably formed of resilient material that normally holds the terminal 74 in engagement with the terminal 75 on the contact element 64 that is grounded as indicated at 65 to some suitable portion of the vehicle. The coil 68 is arranged to have sufficient capacity to move the plunger 70 forwardly of the vehicle and as the plunger is pivotally connected to the arm 23 it will rock the same forwardly against the action of the spring 24 and thereby shift the clutch 20 out of overdrive relation so that the transmission mechanism will transmit a drive at a lower speed ratio while the solenoid is energized. It is also conventional to associate with a low tension line in the ignition system a ground-out system that is associated to operate in timed relation with the solenoid system. This ground-out system includes a disk 60 fixed to a stem 63 extending through an opening in the solenoid casing 61, the disk being arranged to engage with terminals 58 and 59 and being normally held out of engagement by a coil spring 62.

Ordinarily terminal 58 is connected directly to the low tension line, and the ground-out system and the solenoid system are both controlled by the switch 44 that has been arranged to be self-opening but closed by the lever 38 when the accelerator pedal is depressed beyond wide open throttle position. With such an arrangement energizing of the solenoid will first move the disk contact member 60 into engagement with the terminals 58 and 59 thereby temporarily grounding out the ignition system and very soon thereafter the coil 68 will draw the plunger 70 to the left, that is forwardly shifting the clutch 20 out of overdrive relation. This timing relation is such that three or four sparkings of the spark plugs will be missed to thereby relieve the torque on the transmission mechanism in order that the coil will have sufficient strength to move the lever 23 against the combined normal force of torque and the spring 24. As the plunger 70 moves forwardly it engages the stem 63 of the contact 60 and moves the contact 60 away from the terminals 58 and 59 to thereby discontinue grounding out of the ignition system. When the plunger has been moved forwardly by the coil 68 and unseats the contact 60, the contact stem will engage the breaker and move the same forwardly to break the connection between the terminals 74 and 75 so that the coil 68 will thus become de-energized but the coil 69 has sufficient capacity to hold the plunger in its forwardly shifted position until the switch 44 is disconnected. Thus so long as the accelerator is held below full open throttle position the clutch shifting member will be held in its forward position to thereby hold the clutch out of overdrive relation and allow the drive through the transmission at a lower speed ratio than overdrive.

With such a system difficulty has been encountered because of failure of the solenoid coils, sticking of switches and extreme stiffness in an occasional transmission. These various conditions have resulted in a continued ground-out of the ignition system. While such conditions may be only temporary a single failure to resume ignition is extremely dangerous because this shift is ordinarily only used when traveling at full open throttle speed and when it is desirable to pass another vehicle, and hence in passing another vehicle the operator will find himself with a dead motor at the time he requires acceleration in the event of the approach of a car traveling in the opposite direction. This condition has been recognized with systems of the type so far described and it has been proposed to utilize a fuse arranged so that after a predetermined spark interruption the fuse will burn out and the ground-out will cease so that the ignition system will again function. With the use of a fuse in this relation it becomes necessary to remain in overdrive until the burnt-out fuse is replaced and it is not always convenient to replace the fuse and requires the carrying of extra fuses for this purpose.

It is the purpose of this invention to improve upon the system so far described by providing means for positively discontinuing the ground-out of the ignition system and without the necessity of part replacements. The arrangement is preferably such that the ground-out can be discontinued at any time through means under control of the accelerator pedal and operated in conjunction with the switch in the solenoid system.

The switch 44 is housed in a casing 45 and spaced in the casing are two pairs of terminals, the terminals 46 and 47 being arranged in the ground-out system and the terminals 48 and 49 being arranged in the solenoid system. The wire 66 is connected with the terminal 48 and wire 67 is connected with the terminal 49, the last mentioned wire leading to the solenoid coils. A wire 56 is tapped into the low tension line 29 and leads to the terminal 46 while a wire 57 leads from the terminal 47 to the terminal 58. Slidably mounted in the switch casing 45 is a carrier 50 on which spaced switch contact disks 54 and 55 are fixed, the element 54 being arranged to engage the ground-out terminals 46 and 47 and the contact element 55 being arranged to engage the terminals 48 and 49 in the solenoid system. Also fixed on the carrier 50 is a retainer 52 that is engaged by a coil spring 53 in a relation normally moving the carrier to disengage the contact disks 54 and 55. The carrier 50 projects beneath the switch casing in a relation to be moved upwardly by the shoulder 51 on the accelerator pedal actuated lever 38. The switch disks 54 and 55 are arranged so that the disk 54 will engage the terminals 46 and 47 slightly before the switch 55 engages the terminals 48 and 49, and thus the ground-out line is connected upon initial movement of the carrier and just prior to the energizing of the solenoid so that when the contact member 60 engages terminals 58 and 59 the ground-out will be established.

In Fig. 1, A represents the normal position of the accelerator pedal and B the position to which the pedal is moved when the engine throttle is moved to wide open position. When the throttle is depressed below position B then the carrier 50 will be moved to close the switch disks 54 and 55 and the systems will function as previously described to first temporarily ground out the ignition system and to then shift the clutch 20 out of overdrive position and this overdrive relation will continue so long as the carrier is held by the accelerator pedal actuated mechanism in a relation to engage the switch disks 54 and 55. If for any reason the ground-out should continue beyond the desired period and the operator finds himself with a dead motor, then he merely has to release the accelerator pedal and the spring 53 will move the carrier to a relation such that the switch disks 54 and 55 will be moved out of contact with their associated terminals whereupon the ignition system will resume operation.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In apparatus for controlling a sun gear in a transmission mechanism of an automotive vehicle driven by an internal combustion engine having electrical ignition apparatus, the combination with a pawl movable to hold or release the sun gear, of spring means urging said pawl in one direction of its movement, solenoid means for moving the pawl in the opposite direction to that in which it is urged by said spring means, a current source for energizing the electrical ignition apparatus and the solenoid, means operable to control the energizing of said solenoid, means for grounding the engine ignition and automatically restoring the same after being grounded for a short time, said ignition grounding and restoring means being operated in conjunction with energizing of the solenoid, and manually operable means for restoring operation of the engine ignition when grounded.

2. In a motor vehicle having a transmission mechanism including a sun gear, an electrical ignition apparatus and throttle control mechanism, control means comprising a pawl shiftable to hold or release said sun gear, spring means urging said pawl in one direction of its movement, a solenoid for moving said pawl in the other direction of its movement, an electrical system for energizing the ignition apparatus and the solenoid, means controlling the electrical system leading to the solenoid, a temporary ground system for the ignition controlled by said solenoid, and means under the control of said throttle control mechanism for restoring the ignition at will.

3. In a motor vehicle, an electric spark ignition circuit including a coil and a distributor having a low tension connection, a drive mechanism including a shiftable speed changing element, a solenoid system in parallel with said ignition circuit including a solenoid plunger connected to actuate said speed changing element, a ground-out system tapped to said low tension connection, a pair of switch contact members arranged one in the ground-out system and the other in the solenoid system, a manually operable carrier for said switch contact members, and pressure exerting means engaging said carrier in a relation normally opening said contact members.

4. In a motor vehicle, an electric spark ignition circuit including a coil and a distributor having a low tension connection, a drive mechanism including a shiftable speed changing element, a solenoid system in parallel with said ignition circuit including a solenoid plunger connected to operate said speed changing element, a ground-out system tapped into said low tension connection, a pair of adjacent switches associated one in the solenoid system and the other in the ground-out system, a carrier to which the switches are fixed, means engaging said carrier to normally disengage the switches, and throttle control mechanism movable to engage said carrier to close said switches while beyond wide open throttle position.

5. In a motor vehicle, an electric spark ignition circuit including a coil and a distributor having a low tension connection, a drive mechanism including a shiftable speed changing element, a solenoid system in parallel with said ignition circuit including a pair of coils and a plunger connected to actuate said element, a ground-out system tapped to said low tension connection, a normally open switch in said ground-out system arranged to be closed by said solenoid and then opened by said solenoid plunger, a pair of adjacent normally open switches arranged one in the ground-out system in advance of the solenoid actuated switch and the other in the solenoid system in advance of the solenoid coils, a carrier to which said pair of switches are fixed in a relation to close the associated systems, the ground-out switch of the pair closing slightly in advance of the solenoid system switch, and manually operable means for actuating said carrier to close the associated switches.

6. In a motor vehicle, an electric spark ignition circuit including a coil and a distributor having a low tension connection, a drive mechanism including a shiftable speed changing element, a solenoid system in parallel with said ignition circuit including a solenoid plunger connected to actuate said speed changing element, a ground-out system tapped into said low tension connection, a pair of switch contact members arranged one in the ground-out system and the other in the solenoid system, a manually operable carrier to which the pair of contact members are fixed, the contact member in said ground-out system being arranged to close in advance of the other contact member, and spring means exerting pressure against said carrier to normally move said contact members to open position.

7. In a motor vehicle, an electric spark ignition circuit including a coil and a distributor having a low tension connection, a drive mechanism including a shiftable speed changing element, a solenoid system in parallel with said ignition circuit, said system including a pair of grounded coils and a plunger connected to actuate said speed changing element, said coils having different capacities with the higher capacity coil grounded through a self-closing breaker and the other coil when energized serving to hold said plunger after being shifted by the higher capacity coil, a spring opened switch in said ground-out system arranged between said breaker and said plunger, said switch being closed by said lower capacity coil when energized and being later opened by said plunger when shifted, a pair of adjacent switches arranged one in the ground-out line ahead of said spring opened switch and the other in said solenoid system ahead of said coils, said pair of switches being mounted for simultaneous operation, a spring associated to normally open said pair of switches, and manually operable mechanism for moving said pair of switches to closed position, the ground-out switch of said pair of switches being arranged to close slightly in advance of the solenoid system switch.

8. In a motor vehicle, an electric spark ignition circuit including a coil and a distributor having a low tension connection, a drive mechanism including a shiftable speed changing element, a solenoid system in parallel with said ignition circuit, said system including a pair of grounded coils and a plunger connected to actuate said speed changing element, said coils having different capacities with the higher capacity coil grounded through a self-closing breaker and the other coil when energized serving to hold said plunger after being shifted by the higher capacity coil when energized, a spring opened switch in said ground-out system arranged between said breaker and said plunger, said switch being closed by said lower capacity coil when energized and being later opened by said plunger when shifted, a pair of adjacent switches arranged one in the ground-outline ahead of said spring opened switch and the other in said solenoid system ahead of said coils, said pair of switches being mounted for simultaneous operation, a spring associated to normally move said pair of switches to open position, and accelerator mechanism operable to move said pair of switches to closed position, the ground-out switch of said pair of switches being arranged to close slightly in advance of the solenoid system switch.

LESTER L. BELTZ.